J. F. & E. P. Monroe.

Egg-Beater.

No. 1,062. Reissued Oct. 16, 1860.

Attest:

Thos. R. Roach

Thos. L. Glover

Inventors.

Edwin P. Monroe,

Assignee of J. F. & E. P. Monroe

UNITED STATES PATENT OFFICE.

EDWIN P. MONROE, OF NEW YORK, N. Y., ASSIGNEE OF J. F. MONROE AND E. P. MONROE.

IMPROVED EGG-BEATER.

Specification forming part of Letters Patent No. 23,694, dated April 19, 1859; Reissue No. 1,062, dated October 16, 1860.

*To all whom it may concern:*

Be it known that JAMES F. MONROE, of Fitchburg, in the county of Worcester and State of Massachusetts, and EDWIN P. MONROE, of the city, county, and State of New York, have invented certain Improvements in Egg-Beaters, of which the following is a full, clear, and exact description, reference being had to the accompanying drawings, making part of this specification, in which—

Figure 1:
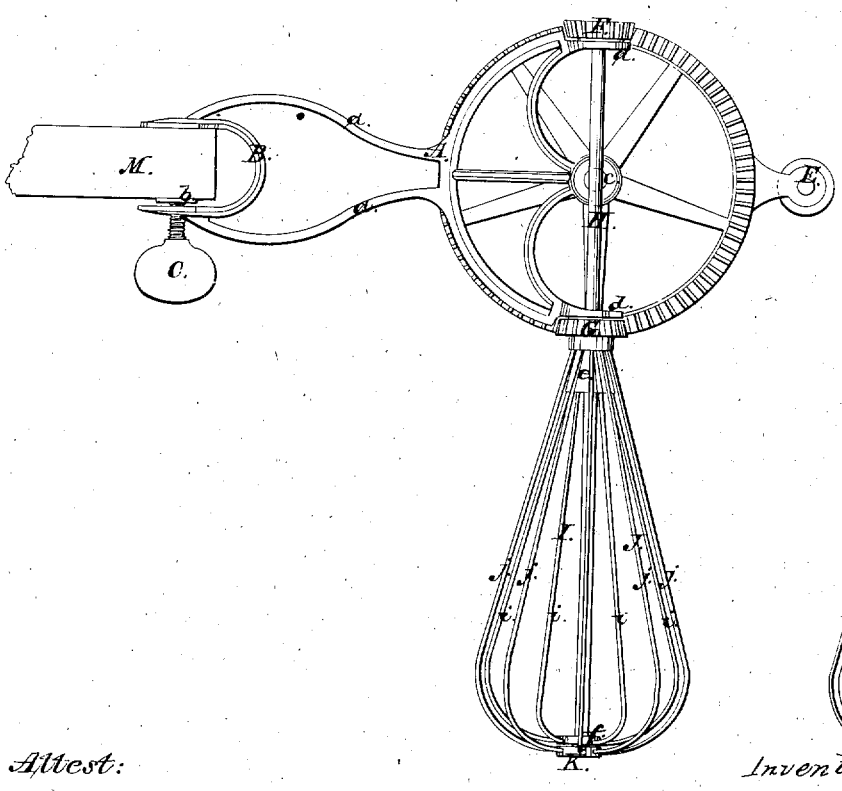
Figure 2:
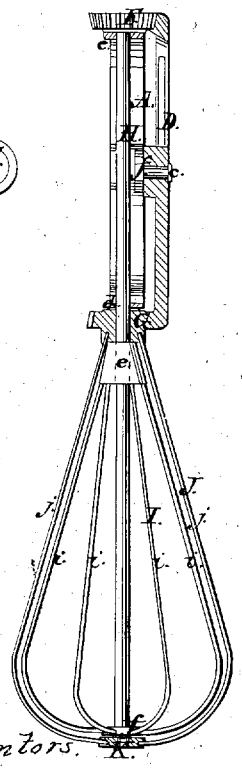

Figure 1 is a front elevation of our improved egg-beater; Fig. 2, a vertical section through the middle of the same.

We are aware that an apparatus for mixing, stirring, or beating up fluids has been constructed in which the beater was revolved rapidly in a vessel by means of a pinion and cog-wheel attached by a frame to the top of the vessel. This restricted the operator to the use of the same vessel whenever the beater was employed, while it is desirable—as when beating up eggs or in other similar operations—to be able to use vessels of various forms and sizes.

Our present invention consists, first, in attaching the beater and the mechanism by which it is rotated to a light frame, which may be secured to a shelf, table, or other convenient place, so that any suitable vessel containing the article to be beaten or stirred may be held under the beater while it is operated; second, in certain improvements in the construction of the beater by which the operation of beating or stirring up is facilitated—viz, by the employment of two sets or wires or beaters revolving concentrically one within the other in opposite directions.

That others skilled in the art may understand and use our invention, we will proceed to describe the manner in which we have carried out the same.

In the said drawings, A is a light metal frame from which project on one side two arms, *a*, which terminate in a bow or clamp, B, which is intended to be slipped onto the edge of a shelf or table, as at M, where it is secured by a thumb-screw, C. A loose nut, *b*, on the end of the screw C prevents its bruising the wood. From the opposite side of the frame A project two brackets, *d*, which serve as bearings for a shaft, H, which has secured to its top a beveled pinion, F, and is embraced by another similar pinion, G, which runs loosely on this shaft. Below the pinion G there is secured to the shaft H a collar, *e*, and near its lower end another collar, *f*. The bent wires *i* are secured to these two collars and thus form the beater I, which revolves with the shaft H, when it is turned. A loose collar, K, embraces the lower end of the shaft H immediately below the fast collar *f*, and turns freely on the shaft. To this collar K and to the pinion G are attached the bent wires *j*, which form the beater J, which is of a rather greater diameter and embraces the beater I. A beveled wheel, D, furnished with a handle, E, revolves on a pivot, *c*, which projects from a central hub, $f^2$, on the frame A. This wheel engages with the two pinions F and G, and as they are placed on opposite sides of the wheel it revolves them in opposite directions, the pinion F and shaft H revolving the beater I in one direction while the pinion G revolves the beater J and collar K, to which it is attached, in the opposite direction.

The rapid revolutions of the two beaters I and J in opposite directions serve to beat up or stir up eggs or other fluids into which they are inserted much more expeditiously and with less labor than any other beater with which we are acquainted, and, by providing the beater with a frame which may be clamped to the edge of a table or other convenient place, any ordinary vessel containing the eggs or other article to be stirred may be held beneath the beater while it is being operated, an advantage which will be readily appreciated in such establishments as hotel kitchens, confectioneries, and restaurants.

What is claimed as the invention of J. F MONROE and E. P. MONROE is—

1. In combination with a rotary egg-beater, an arm, *a*, having at one end bearings for the journals to rotate in and at the other a clamping device for the purpose of securing the beater to the table with its shaft or bearings in a vertical line, as set forth.

2. The beaters I and J, revolved in opposite directions by suitable mechanism, substantially as set forth.

EDWIN P. MONROE,
*Assignee of J. F. and E. P. Monroe.*

Witnesses:
THOS. R. ROACH,
THOS. L. GLOVER.